United States Patent [19]

Hart, Jr. et al.

[11] 4,054,506
[45] Oct. 18, 1977

[54] METHOD OF REMOVING BITUMEN FROM TAR SAND UTILIZING ULTRASONIC ENERGY AND STIRRING

[75] Inventors: Louis I. Hart, Jr., Littleton; Josef J. Schmidt-Collerus, Denver, both of Colo.; Larry R. Burroughs, Calgary, Canada

[73] Assignee: Western Oil Sands Ltd., Denver, Colo.

[21] Appl. No.: 718,923

[22] Filed: Aug. 30, 1976

Related U.S. Application Data

[63] Continuation-in-part of Ser. No. 681,163, April 28, 1976.

[51] Int. Cl.$^2$ ............................................... C10G 1/04
[52] U.S. Cl. ................................................. 208/11 LE
[58] Field of Search ................................... 208/11 LE

[56] References Cited

U.S. PATENT DOCUMENTS

| 2,973,312 | 2/1961 | Logan | 208/11 LE |
| 3,017,342 | 1/1962 | Bulat et al. | 208/11 LE |
| 3,123,546 | 3/1964 | Bodine | 208/11 LE |
| 3,605,975 | 9/1971 | Brimhall | 208/11 LE |

FOREIGN PATENT DOCUMENTS 633,063  12/1961  Canada .......................... 208/11 LE

*Primary Examiner*—Delbert E. Gantz
*Assistant Examiner*—James W. Hellwege
*Attorney, Agent, or Firm*—Ancel W. Lewis, Jr.

[57] ABSTRACT

A method of removing bitumen from tar sand for subsequent recovery of the bitumen. The method comprises contacting tar sand with an excess of solvent in which the bitumen is soluble, said contacting being performed within a vessel wherein simultaneously the solvent is being stirred and ultrasonic energy is being applied, the ultrasonic energy being of an intensity sufficient to break apart any connections between sand granules and to remove bitumen from the sand granules to thereby permit the bitumen so removed to go into solution in the solvent for subsequent removal of the solvent-plus-bitumen and recovery of the bitumen therefrom. Stirring within the vessel reduces residence time required for removal of the bitumen from the tar sand by constantly changing that portion of the solvent directly in contact with the surface of the tar sand to thereby cause even loading of all of the solvent with the bitumen. The vessel utilized can be a column through which the tar sand falls as ultrasonic energy is applied and stirring occurs therein.

5 Claims, No Drawings

METHOD OF REMOVING BITUMEN FROM TAR SAND UTILIZING ULTRASONIC ENERGY AND STIRRING

CROSS REFERENCE TO RELATED APPLICATION

This application is a continuation-in-part of our co-pending application Ser. No. 681,163, filed Apr. 28, 1976.

BACKGROUND OF THE INVENTION

Tar sand is composed of a mixture of viscous hydrocarbon compounds, known as bitumen, occupying pore space within rocks such as sandstone, dolomite, and loose sedimentary deposits, with the particles thereof essentially being bitumen in varying amounts adsorbed on sand granules. Deposits of tar sand are found in the ground in many areas of the world, and are removed from the earth through utilization of mining techniques known in the art for subsequent removal and recovery of the bitumen for refining into usable petroleum products.

Traditional commercial methods employed in the removal of bitumen from tar sand include hot water extraction, pyrolysis, and solvent extraction. Hot water extraction involves heating tar sand with steam, hot water, and sodium hydroxide in separation tanks wherein the sand falls to the bottom and the bitumen floats to the top and is then removed for reclamation. Pyrolysis consists of partial combustion of the tar sand to decompose the bitumen molecules into gases and liquids for subsequent recovery and refinement. The solvent extraction method involves mixing tar sand with a solvent in which bitumen is soluble, and then removing the solvent-plus-bitumen from the remaining sand for subsequent recovery of the bitumen.

Use of ultrasonic energy has been disclosed by Sherborne (U.S. Pat. No. 2,670,801), Morrell, et al. (U.S. Pat. No. 2,722,498), Logan (U.S. Pat. No. 2,973,312), Bodine (U.S. Pat. Nos. 3,123,546 and 3,189,536), Branson (U.S. Pat. No. 3,222,221), and Pelopsky, et al. (U.S. Pat. No. 3,497,005) in relation to removal of organic substances from various matter in solvent media. Bodine describes the release from tar sand of petroleum tar (bitumen) in the physical form of a hydrocarbon liquid. However, the prior disclosures do not teach the use of ultrasonic energy in concert with stirring of the solvent as disclosed in the instant application to reduce residence time required for removing bitumen from tar sand and thereby increase efficiency of removal.

SUMMARY OF THE INVENTION

The subject of this invention is a method of removing bitumen from tar sand for subsequent recovery of the bitumen. The method comprises contacting tar sand with an excess of solvent in which the bitumen is soluble, said contacting being performed within a vessel wherein simultaneously the solvent is being stirred and ultrasonic energy is being applied, the ultrasonic energy being of an intensity sufficient to break apart any connections between sand granules and to remove bitumen from the sand granules to thereby permit the bitumen so removed to go into solution in the solvent for subsequent removal of the solvent-plus-bitumen and recovery of the bitumen therefrom. Stirring within the vessel reduces residence time required for removal of the bitumen from the tar sand by constantly changing that portion of the solvent directly in contact with the surface of the tar sand to thereby cause even loading of all of the solvent with the bitumen. The vessel utilized can be a column through which the tar sand falls as ultrasonic energy is applied and stirring occurs therein.

In one preferred embodiment the solvent utilized is petroleum condensate which is essentially raw gasoline, but any other solvent in which the bitumen is soluble can be employed. Intensity of ultrasonic energy in one preferred embodiment is 25 kz., but such intensity can be varied as required to achieve the results of this invention. Likewise, in the immediately preceding preferred embodiment, the speed of the stirrer blade is 1000 revolutions per minute, but such speed can also be varied as required. The preferred physical configuration of the tar sand to be processed is a pellet configuration achieved as known in the art of one-fourth inch or less diameter in size. This configuration is preferred because it presents a high surface-area exposure per unit of weight, but, of course, it is to be recognized that the inventive method which is the subject of this application is not limited to this preferred configuration.

DETAILED DESCRIPTION OF PREFERRED EMBODIMENTS

Disclosed herein is a method of removing bitumen from tar sand, the method comprising contacting tar and with an excess of solvent in which the bitumen is soluble, said contacting being performed within a vessel wherein simultaneously the solvent is being stirred and ultrasonic energy is being applied. The various procedures employed and the results thereof are shown as follows.

A chunk of tar sand weighing approximately 110 grams is placed in a beaker and covered 50 with ml (about 2 times the dead volume of the tar sand) of a solvent comprising a reagent grade mixture by volume of 23% ethylbenzene, 14% ortho-xylene, 55% meta-xylene, and 8% para-xylene. The solvent is kept stirred with a small stirring blade operated by a small stirring motor at a speed of 15 revolutions per minute. The stirring blade keeps the solvent circulating, but does not contact the tar sand. Immediately thereafter, a sonic head of one-half inch diameter is placed in the solvent and 60 kilocycles of sonic energy is applied for a period of 60 seconds to break apart any connections between sand granules and to concurrently remove from the sand granules bitumen which goes into solution in the solvent. The resulting solvent-plus-bitumen is then decanted for subsequent recovery of the bitumen. To indicate the effectiveness of the sonic energy, further experimentation is shown in Table I, below, comparing the bitumen recovered from the above decantation against four subsequent consecutive respective 30 ml amounts of the same solvent put in contact with the tar sand for respective 30 second periods and then respectively decanted. Acetone is used in Extraction No. 6 of Table I to remove all solvent from the remaining sand.

TABLE I
EXTRACTION OF TAR SANDS AT AMBIENT TEMPERATURE
AND SLOW STIRRING UTILIZING SONIC ENERGY IN THE FIRST EXTRACTION

| Extraction No. | Amount of Solvent | Extraction Time | Extracted Bitumen (Wt. %) |
|---|---|---|---|
| 1 (Sonic used) | 50 ml | 60 sec. | 11.5 |
| 2 | 30 ml | 30 sec. | 13.4 |

TABLE I-continued
EXTRACTION OF TAR SANDS AT AMBIENT TEMPERATURE AND SLOW STIRRING UTILIZING SONIC ENERGY IN THE FIRST EXTRACTION

| Extraction No. | Amount of Solvent | Extraction Time | Extracted Bitumen (Wt. %) |
|---|---|---|---|
| 3 | 30 ml | 30 sec. | 14.3 |
| 4 | 30 ml | 30 sec. | 14.4 |
| 5 | 30 ml | 30 sec. | 14.7 |
| 6 | 30 ml acetone | 30 sec. | 14.7 |
| Total | 200 ml | 3.5 minutes | 14.7 |

Analysis of the above tar sand shows that the total amount of bitumen present originally by weight percent is 14.7. Table I shows that 78% of the total bitumen content was removed from the tar sand and in solution in the solvent 60 seconds after the procedure began.

To contrast the results in Table I, a second procedure, the solvent extraction method, was undertaken using a second sample of tar sand, the same solvent, and the same amount of stirring, but without using sonic energy. The results of this procedure are shown in Table II, below.

TABLE II
EXTRACTION OF TAR SANDS AT AMBIENT TEMPERATURE AND SLOW STIRRING WITHOUT UTILIZATION OF SONIC ENERGY

| Extraction No. | Amount of Solvent | Extraction Time | Extracted Bitumen (Wt. %) |
|---|---|---|---|
| 1 | 110 ml | 4 hours | 8.5 |
| 2 | 30 ml | 3 hours | 11.0 |
| 3 | 30 ml | 3 hours | 12.4 |
| 4 | 30 ml | 3 hours | 13.1 |
| 5 | 30 ml | 3 hours | 13.1 |
| 6 | 30 ml acetone | 3 hours | 13.5 |
| Total | 260 ml | 19 hours | 13.5 |

Analysis of the above tar sand shows that the total amount of bitumen present originally by weight percent is 13.5 Table II shows that even with additional solvent and 4 hours of contact of solvent with the tar sand, only 63% of the total bitumen content was removed from the tar sand and in solution in the solvent. Further, at Extraction No. 5, 16 hours into the procedure, a small amount of bitumen still had not been removed from the tar sand. This is contrasted to Extraction No. 5 of Table I wherein, after only three minutes into the procedure, all of the bitumen was removed from the tar sand.

To demonstrate the effectiveness of using stirring in addition to using ultrasonic energy in relation to bitumen uptake by the solvent, experiments were conducted in which bitumen was extracted from tar sand by using ultrasonic energy both with and without stirring in a large beaker. The ultrasonic energy frequency used was 25 kz., and the quantity of bitumen extracted from the tar sand was measured as a function of time.

Ninety grams of ¼ inch diameter pellets of tar sand were placed in 250 ml of petroleum condensate (raw gasoline). An ultrasonic application of 25 kz. frequency was applied as was a stirrer blade rotating at 1000 revolutions per minute. Small samples of bitumen-plus-solvent were removed at 15, 30, 60, 120, and 30 seconds. A second identical experiment, with the exception of the stirring, was also undertaken, with small samples likewise at 15, 30, 60, 120, and 300 seconds. Each set of bitumen-plus-solvent samples were then analyzed for bitumen uptake. This analysis was performed with a Beckman DG spectrophotometer measuring the light transmittance at a wavelength of 500 nanometers. The quantities of bitumen extracted from the tar sand and in solution in the solvent, with and without stirring, are compared in Table III, below.

TABLE III
PER CENT COMPARISON OF BITUMEN CONTAINED IN SOLVENT WITH AND WITHOUT UTILIZATION OF STIRRING

| Time (Seconds) | With Stirring (Wt. % of Solution) | Without Stirring (Wt. % of Solution) |
|---|---|---|
| 15 | 1.44 | 0.42 |
| 30 | 2.40 | 0.64 |
| 60 | 3.06 | 0.63 |
| 120 | 3.27 | 1.01 |
| 300 | 3.99 | 1.96 |

The improved results with stirring are due to the removal of the bitumen film away from the surface of the tar sand by macroscopic mixing which effectively introduces cleaner solvent to the tar sand surface which in turn increases the mass transfer driving force. Comparison of the results outlined in Table III shows that stirring enhances bitumen recovery and, because tar sand is an agglomerate, stirring consequently decreases the time required to disintegrate this agglomerate and enhance bitumen uptake by the solvent, thus significantly decreasing the residence time required for said uptake.

Should it be necessary to return the bitumen-free sand granules to their source in the ground, the use of acetone as a final step, shown in Tables I and II and applicable to any specific procedure, removes the solvent, whether the solvent contains bitumen or be bitumen-free, from the sand granules to thus yield a pure sand which can be dried and returned to the earth without producing environmentally unsafe consequences.

While ambient temperature can be used in each of the foregoing procedures, a greater or lesser temperature can be employed with resulting expected action to the compounds and components used. Likewise, the velocity of stirring can be increased or decreased as dictated by the circumstances presented. Intensity and time of ultrasonic energy application can likewise be adjusted as required. While ultrasonic energy application produces circulation within the solvent, it appears that such circulation is in a wave-like pattern giving only local mixing and does not produce the macroscopic mixing achieved with stirring.

A production plant facility which yields a commercial volume of solvent-plus-bitumen utilizes a column as a vessel wherein ultrasonic energy is applied and stirring occurs as the tar sand falls from top to bottom while the bitumen is removed from the tar sand. Introduction of solvent into the column can be accomplished in a countercurrent pattern as known in the art, one or more impeller blades can be mounted within the column, and ultrasonic energy can be applied as with the use of one or more ultrasonic heads disposed within the column.

We claim:

1. A method of removing bitumen from tar sand for subsequent recovery of the bitumen, the method comprising contacting tar sand with an excess of solvent in which the bitumen is soluble, said contacting being performed within a column through which the tar sand falls from top to bottom while the bitumen is being removed from the tar sand wherein simultaneously the solvent is being stirred to enhance the circulation of the solvent relative to the tar sand to remove a bitumen film away from the surface of the tar sand and ultrasonic energy is being applied, the ultrasonic energy being of an intensity sufficient to break apart any connections between sand granules and to remove bitumen from the sand granules to thereby permit the bitumen so removed to go into solution in the solvent for subsequent removal of the solvent-plus-bitumen and recovery of the bitumen therefrom.

2. A method of removing bitumen from tar sand as claimed in claim 1 wherein the solvent is raw gasoline.

3. A method of removing bitumen from tar sand as claimed in claim 1 wherein the amount of solvent is two times the dead volume of the tar sand.

4. A method of removing bitumen from tar sand as claimed in claim 1 wherein the method is performed at ambient temperature.

5. A method of removing bitumen from tar sand for subsequent recovery of the bitumen and of removing all solvent from sand granules thus cleansed, the method comprising:

a. contacting tar sand with an excess of solvent in which the bitumen is soluble, said contacting being performed within a vessel wherein simultaneously the solvent is being stirred to enhance the circulation of the solvent relative to the tar sand to remove bitumen film away from the surface of the tar sand by macroscopic mixing so as to effectively introduce cleaner solvent to the surfaces of said tar sand to speed up the bitumen removal process and ultrasonic energy is being applied, the ultrasonic energy being of an intensity sufficient to break apart any connections between sand granules to remove bitumen from the sand granules to thereby permit the bitumen so removed to go into solution in the solvent for subsequent removal of the solvent-plus-bitumen therefrom; and b. washing with acetone the sand granules from which the bitumen is thus removed to remove all solvent from said sand granules.

* * * * *